US008801328B2

(12) United States Patent  
Thompson et al.

(10) Patent No.: US 8,801,328 B2  
(45) Date of Patent: *Aug. 12, 2014

(54) POWERED SHEAVE FOR NODE DEPLOYMENT AND RETRIEVAL

(71) Applicant: Fairfield Industries Incorporated, Sugar Land, TX (US)

(72) Inventors: James N. Thompson, Sugar Land, TX (US); Jerry L. Laws, Huntsville, TX (US); Larry E. Berges, New Iberia, LA (US)

(73) Assignee: Fairfield Industries Incorporated, Sugar Land, TX (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/710,246

(22) Filed: Dec. 10, 2012

(65) Prior Publication Data

US 2013/0101355 A1    Apr. 25, 2013

Related U.S. Application Data

(63) Continuation of application No. 13/341,701, filed on Dec. 30, 2011, now Pat. No. 8,328,467, which is a continuation of application No. 12/199,724, filed on Aug. 27, 2008, now Pat. No. 8,087,848.

(51) Int. Cl.  
*G01V 1/38* (2006.01)

(52) U.S. Cl.  
USPC .......................... 405/166; 405/169; 405/173

(58) Field of Classification Search  
USPC ............ 405/158, 166, 168.1, 168.3, 169, 173  
See application file for complete search history.

(56) References Cited

U.S. PATENT DOCUMENTS

| | | | |
|---|---|---|---|
| 4,354,667 A | | 10/1982 | Svendsen |
| 4,511,122 A | | 4/1985 | Svendsen |
| 4,570,245 A | | 2/1986 | Thigpen |
| 4,920,680 A | * | 5/1990 | Lindgren .......................... 43/4.5 |
| 5,189,642 A | | 2/1993 | Donoho et al. |
| 5,197,716 A | * | 3/1993 | Zibilich et al. ........ 254/134.3 SC |
| 5,199,659 A | * | 4/1993 | Zibilich, Jr. ................... 242/470 |
| 5,623,455 A | | 4/1997 | Norris |
| 5,624,207 A | * | 4/1997 | Berges ........................... 405/173 |
| 5,655,753 A | * | 8/1997 | Berges et al. ........ 254/134.3 SC |
| 5,724,241 A | | 3/1998 | Wood et al. |

(Continued)

OTHER PUBLICATIONS

International Search Report and Written Opinion of the International Searching Authority mailed Apr. 9, 2010 in PCT/US2009/055232.

*Primary Examiner* — Frederick L Lagman  
(74) *Attorney, Agent, or Firm* — Patterson & Sheridan, L.L.P.

(57) ABSTRACT

A method and apparatus for deploying a plurality of seismic sensor units into a water column is provided. In one embodiment, a marine vessel is provided. The vessel includes a cable storage device disposed on the vessel, a workstation disposed on a deck of the vessel, a ramp at least partially disposed on the deck, and a node storage and handling system disposed on the vessel. The node storage and handling system comprises a cable handler disposed between the cable storage device and the ramp, the cable handler having a cable disposed thereon and the cable defining a cable path passing over the workstation during a node deployment or retrieval operation, a node storage rack positioned between a bow and a stern of the vessel, and at least one conveyor belt to transfer nodes between the workstation and the node storage rack.

44 Claims, 12 Drawing Sheets

(56) References Cited

U.S. PATENT DOCUMENTS

| | | | |
|---|---|---|---|
| 5,902,072 A * | 5/1999 | Berges | 405/173 |
| 6,024,344 A | 2/2000 | Buckley et al. | |
| 6,058,072 A | 5/2000 | Abraham | |
| 6,070,857 A | 6/2000 | Dragsund et al. | |
| 6,082,710 A | 7/2000 | Dragsund et al. | |
| 7,310,287 B2 | 12/2007 | Ray et al. | |
| 7,632,043 B2 | 12/2009 | Thompson et al. | |
| 7,649,803 B2 | 1/2010 | Ray et al. | |
| 7,804,737 B2 * | 9/2010 | Thompson | 367/15 |
| 7,883,292 B2 * | 2/2011 | Thompson et al. | 405/166 |
| 7,990,803 B2 | 8/2011 | Ray et al. | |
| 8,087,848 B2 * | 1/2012 | Thompson et al. | 405/166 |
| 8,172,480 B2 * | 5/2012 | Thompson et al. | 405/166 |
| 8,328,467 B2 * | 12/2012 | Thompson et al. | 405/166 |
| 2003/0223822 A1 | 12/2003 | Oldervoll et al. | |
| 2005/0052951 A1 * | 3/2005 | Ray et al. | 367/188 |
| 2005/0169713 A1 | 8/2005 | Luc et al. | |
| 2008/0279636 A1 | 11/2008 | Ray et al. | |
| 2009/0324338 A1 | 12/2009 | Thompson et al. | |
| 2010/0054078 A1 | 3/2010 | Thompson et al. | |

\* cited by examiner

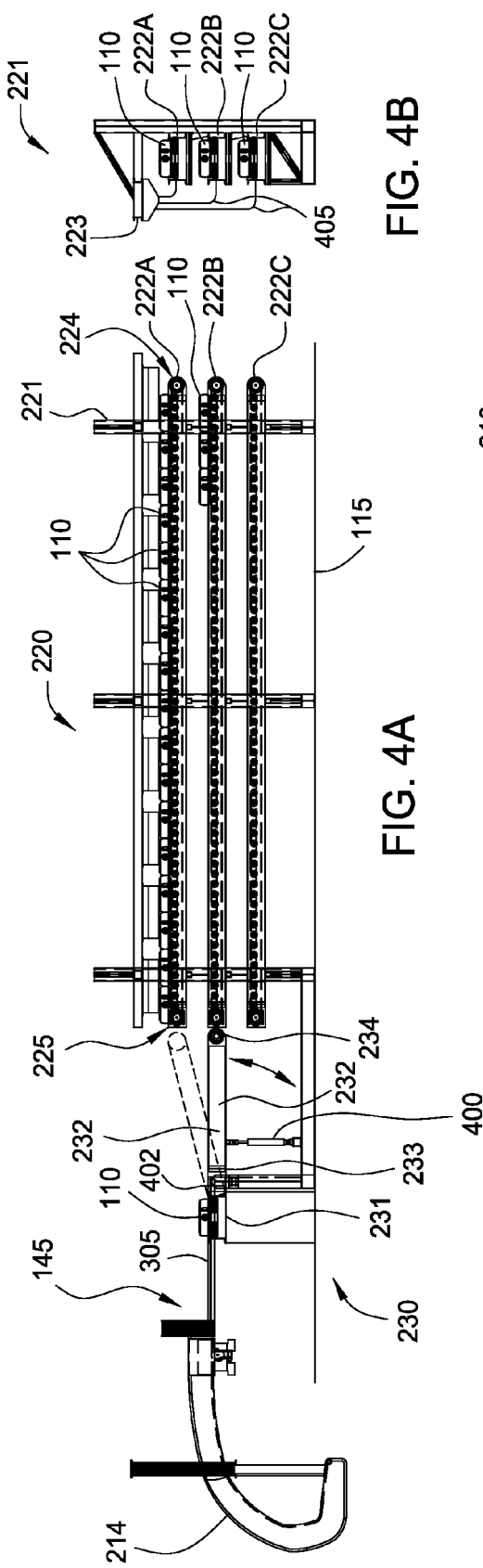
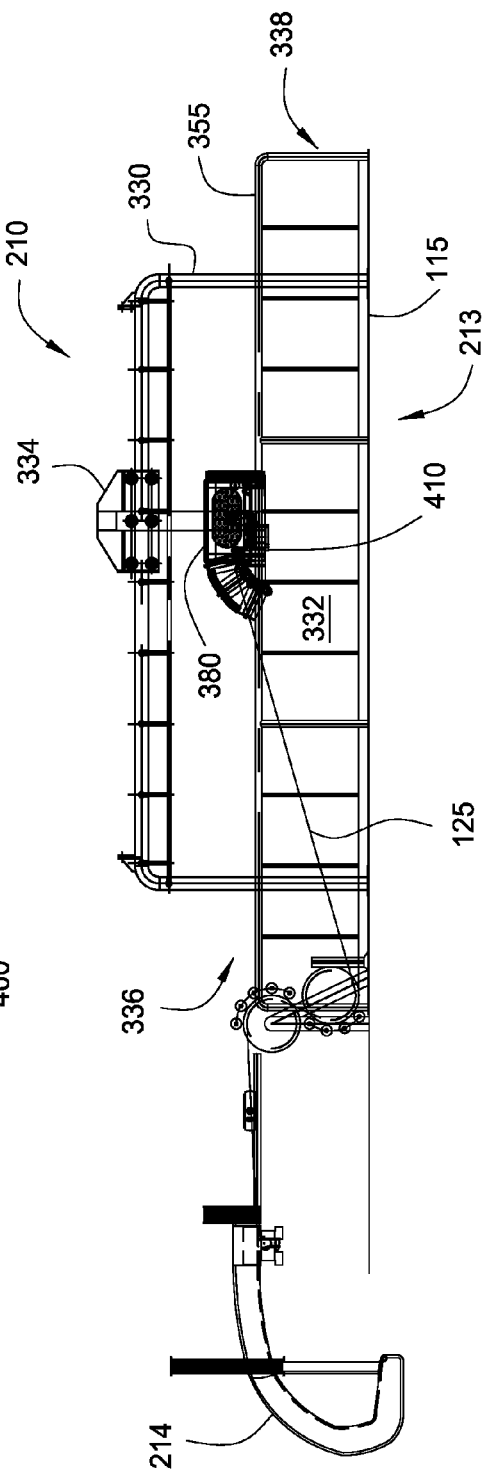

POWERED SHEAVE FOR NODE DEPLOYMENT AND RETRIEVAL

CROSS-REFERENCE TO RELATED APPLICATION

This application is a continuation of U.S. patent application Ser. No. 13/341,701, filed Dec. 30, 2011, which issued as U.S. Pat. No. 8,328,467 on Dec. 11, 2012, which is a continuation of U.S. patent application Ser. No. 12/199,725, filed Aug. 27, 2008, which issued as U.S. Pat. No. 8,087,848 on Jan. 3, 2012, both applications are hereby incorporated by reference herein.

BACKGROUND OF THE INVENTION

1. Field of the Invention

Embodiments of the invention relate to seismic exploration in marine environments.

2. Description of the Related Art

Seismic exploration operations generally utilize a seismic energy source to generate an acoustic signal that propagates into the earth. The acoustic signal is partially reflected by subsurface seismic reflectors in the earth, which may include interfaces between subsurface lithologic or fluid layers that may be characterized by different elastic properties. The reflected signals are detected and recorded by seismic receiver units located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Generally, the method for detection and recording of seismic signals is similar on land and in marine environments; however, marine environments present unique challenges due to the body of water overlaying the earth's surface. Seismic exploration operations in marine environments are typically conducted from the deck of one or more seismic exploration vessels, such as floating platforms or ships. The seismic exploration vessels typically provide storage and transportation for a plurality of seismic receiver units and associated operational equipment. Seismic exploration in deep water typically uses seismic sensor units deployed from the deck of the seismic exploration vessel to be placed on or near the seabed. The seismic sensor units are typically coupled to a rope or cable that is placed in the water and allowed to fall through a water column to the seabed. These seismic sensor units are part of systems typically referred to as Ocean Bottom Cabling (OBC) or Ocean Bottom Seismometer (OBS) systems, wherein data from a seismic survey may be received.

When performing a seismic survey in marine environments, a specific area of the seabed is intended to be explored. Generally, a plurality of seismic sensor units are coupled to a cable and deployed from a deployment vessel to form an array or grid of seismic sensor units on the seabed. Typically, the accuracy of the seismic survey depends upon controlled placement of the sensor units on the seabed. The placement of the seismic sensor units deployed in this manner may be affected by many factors, some of which include position of the deployment vessel in the water, wind speed, speed of the deployment vessel, and underwater currents caused by naturally occurring current flows and/or turbulence generated by the deployment vessel, among other factors.

Conventional deployment methods typically utilize variations in the speed of the deployment vessel to control the deployment of the cable, which can lead to inconsistent deployment of the cable and inconsistent placement of seismic sensor units. For example, if the deployment speed of the vessel is not controlled accurately or responsively, the cable deployment may be erratic, which may cause seismic sensor unit placement inconsistencies. As an example, slack may build up in the cable between the vessel and one or more seismic sensor units that have not fallen to the seabed, which may make the towed cable susceptible to drift by currents. Another example includes slack build-up in the cable between seismic sensor units. Yet another example includes dragging of the seismic sensor units along the seabed. All of these examples can lead to unintended drift or movement of the seismic sensor units, possibly placing them outside of the intended areas to be tested.

Thus, there exists a need for an improved method and apparatus for deploying seismic sensor units to be placed on a seabed from a seismic exploration vessel.

SUMMARY OF THE INVENTION

A method and apparatus for deploying a plurality of seismic sensor units into a water column is provided. In one embodiment, a marine vessel is provided. The vessel includes a cable storage device disposed on the vessel, a workstation disposed on a deck of the vessel, a ramp at least partially disposed on the deck, and a node storage and handling system disposed on the vessel. The node storage and handling system comprises a cable handler disposed between the cable storage device and the ramp, the cable handler having a cable disposed thereon and the cable defining a cable path passing over the workstation during a node deployment or retrieval operation, a node storage rack positioned between a bow and a stern of the vessel, and at least one conveyor belt to transfer nodes between the workstation and the node storage rack.

In another embodiment, a marine vessel is provided. The vessel includes a cable storage device disposed on the vessel, a workstation disposed on a deck of the vessel, a ramp at least partially disposed on the deck adjacent the workstation, and a node storage and handling system disposed on the vessel. The node storage and handling system comprises a cable handler disposed between the cable storage device and the ramp, the cable handler having a cable disposed thereon and the cable defining a cable path passing over the workstation during a node deployment or retrieval operation, a node storage rack positioned between a bow and a stern of the vessel, and at least one conveyor mechanism to transfer nodes directly between the workstation and the node storage rack.

In another embodiment, a method for performing a seismic survey in a marine environment is provided, the method includes a deployment method for deploying a plurality of seismic sensor units into a water column, the deployment method comprising providing a length of flexible cable from a cable storage device disposed on a vessel to a cable handling device, routing the cable to pass adjacent to a workstation disposed on the vessel, attaching an anchor device to a free end of the cable, deploying the free end of the cable into the water column along a ramp disposed on the vessel, adjusting a fall pattern of the cable in the water column by adjusting one or both of the forward speed of the vessel and a deployment speed of the cable handling device, and attaching at least one of the plurality of seismic sensor units to the cable as the cable passes the workstation.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A is a schematic side view of a portion of the node storage and handling system shown in FIG. 3.

FIG. 4B is a schematic front view of the conveyor section of FIG. 4A having one embodiment of a node servicing system.

FIG. 4C is a schematic side view of the cable handling system 210 shown in FIG. 3.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein generally provide methods and apparatus for organization and safety of a marine vessel used in a seismic exploration operation, although certain embodiments of the apparatus and methods may be extended to other operations and industries, such as land based materials handling operations. In some embodiments, an apparatus and method of handling, storage, deployment and/or retrieval of one or more seismic sensors in or on a body of water is described. These seismic sensors may include seismic devices used in Ocean Bottom Cabling (OBC) or Ocean Bottom Seismometer (OBS) systems. The seismic devices may be interconnected electronically, such as by wires or wireless communication links, or may be discrete units where data is stored and/or recorded. In some embodiments, the seismic devices may be detachably coupled to a length of rope or cable during deployment and/or retrieval operations. One type of seismic device includes a self-contained ocean bottom sensor unit, sometimes referred to as a Seafloor Seismic Recorder (SSR), which is configured to receive, record, and store seismic data. SSR's are typically detachably coupled to a length of rope or cable during deployment and retrieval operations. An example of a self-contained ocean bottom sensor unit is described in FIGS. 1-8 of U.S. Pat. No. 7,310, 287, which issued Dec. 18, 2007, and is incorporated herein by reference. Although embodiments described herein are exemplarily described with seismic sensor units that may be detachably coupled to a rope or cable during deployment and/or retrieval operations, the handling methods and apparatus may be used with other devices and in other industries. The seismic sensor units as described herein may be used in OBS systems or OBC systems and are collectively referred to herein after as nodes for ease of description.

Figure 1A:
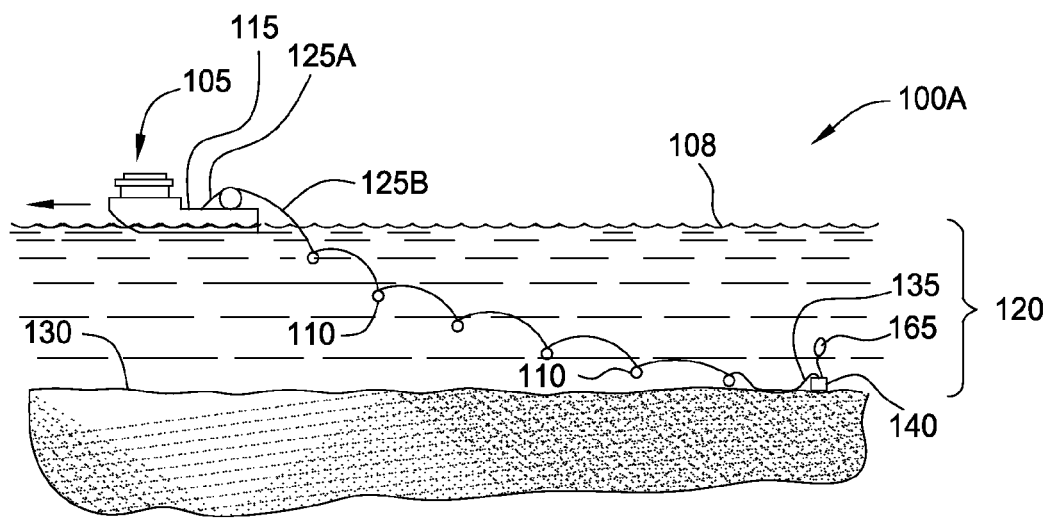
FIG. 1A is a perspective view of one embodiment of a node deployment operation.

FIG. 1A is a perspective view of one embodiment of a node deployment operation 100A. A vessel 105 is positioned on a body of water 108 to deploy nodes 110 from a backdeck 115 of the vessel 105 into a water column 120, although other deployment locations from the vessel 105 may be used. Examples of other deployment locations include the bow or side of the vessel. The power and/or momentum of the vessel 105 may be used to assist in paying out a cable 125A and 125B to which nodes 110 are attached. In this example, a plurality of nodes 110 are tethered to a non-rigid cable 125A to form a mainline cable 125B that is deployed into the water column 120 using the power and/or momentum of the vessel 105. The mainline cable 125B sinks to a resting position on or near a floor 130 of the water column 120. In one embodiment, a free end 135 of the mainline cable 125B is attached to an anchor device 140 such that the cable 125A may be spooled, paid-out, or otherwise deployed from the backdeck 115 of the vessel 105. The free end 135 may also be coupled to a flotation or buoyancy device 165 that may be selectively actuated to assist in locating and/or retrieving the cable 125 after the survey is completed.

Figure 2:
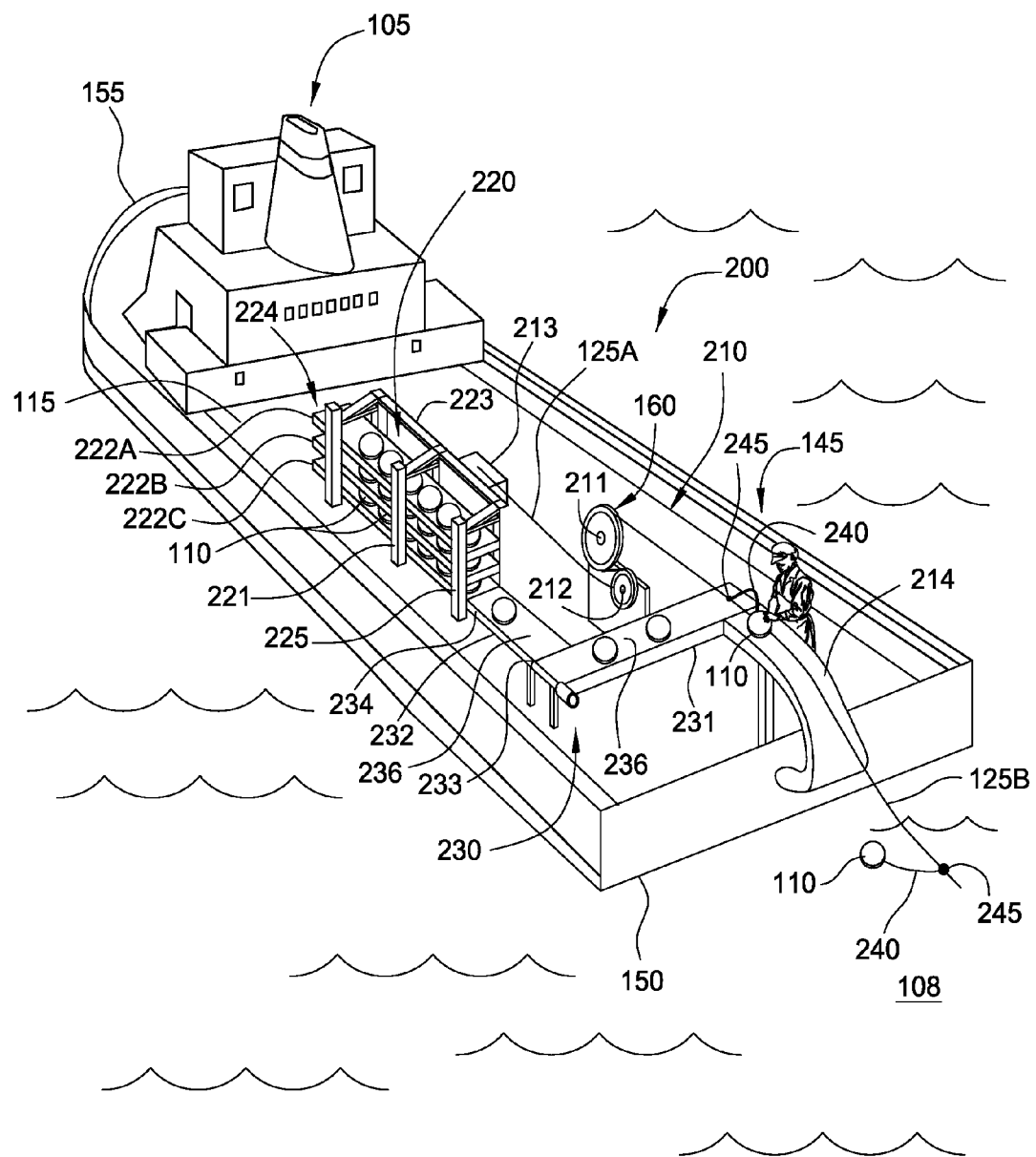
FIG. 2 is an operational view of a seismic vessel on a body of water.

As the cable 125A is routed over the backdeck 115, the cable 125A passes a workstation 145, as shown in FIG. 2, where nodes 110 may be attached to the cable 125A to form the mainline cable 125B. In one example, the nodes 110 are attached individually and sequentially to the cable 125A by personnel on the vessel 105, or suitably mechanically attached to the cable 125A, as the cable 125A passes the workstation 145. Once the mainline cable 125B is positioned on or near the floor 130, a seismic survey may be performed. Upon completion of the seismic survey, the mainline cable 125B may be retrieved from the water column 120. In one embodiment, the buoyancy device 165 is actuated to bring a free end 135 near the surface of the water column 120 where personnel on the vessel 105 may acquire and secure the mainline cable 125B.

Figure 1B:
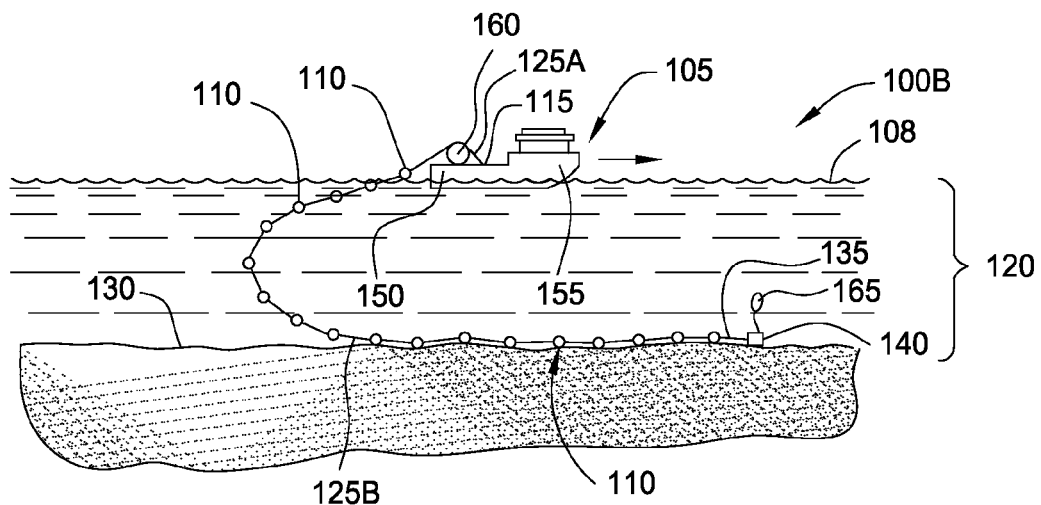
FIG. 1B is a perspective view of one embodiment a retrieval operation.

FIG. 1B is a perspective view of one embodiment a retrieval operation 100B. The vessel 105 has a trailing end 150 and a leading end 155. In this example, the mainline cable 125B is retrieved over the trailing end 150, typically the stern, of the vessel 105 as the leading end 155, typically the bow, of the vessel travels over the mainline cable 125B disposed on the floor 130 in a general direction toward the anchor device 140. The "over the stern" retrieval method uses the water column 120 to reduce dragging, excess tensioning and/or pulling of the cable 125B across the floor 130 as the cable 125B is retrieved.

In one embodiment, the mainline cable 125B is retrieved using a cable handler 160, which may be a winch or a power block, a powered reel, pulley or sheave device. During retrieval, the mainline cable 125B is routed across a portion of the workstation 145 of the vessel 105. As the mainline cable 125B passes by the workstation 145, nodes 110 are detached from the cable 125A. In one embodiment, the nodes 110 are detached by personnel on the vessel 105 or suitable mechanical device at or near the workstation 145. After the nodes 110 are detached, the nodes 110 are stowed in a storage device and serviced if necessary. In one embodiment, the nodes 110 are routed to a storage device where data is collected, batteries are charged, and general servicing, such as quality control and/or maintenance may be performed.

FIG. 2 is an operational view of a seismic vessel 105 on a body of water 108 having one embodiment of a node storage and handling system 200. The node storage and handling system 200 includes a cable handling system 210 and a storage device 220 coupled by a staging portion 230. The node storage and handling system 200 facilitates storage of a plurality of nodes 110 while providing automated routing of nodes 110 during handling, such as during a deployment or retrieval operation.

The storage device 220 includes a conveyor system 221 to store and/or transfer the plurality of nodes 110. In this example, the conveyor system 221 is linear and includes three stacked and independently actuatable conveyor sections 222A, 222B and 222C at different heights above the backdeck 115, although any number of conveyors may be used. In other embodiments, the conveyor system 221 may be non-linear, such as an arcuate conveyor system, for example, a carousel-type conveyor system. Each of the conveyor sections 222A-222C include a movable upper surface 236 adapted to support a plurality of nodes 110. In one embodiment, each conveyor section 222A-222C includes a rotatable belt or mesh adapted to support and transfer the nodes 110. The rotatable belt or mesh on each of the conveyor sections 222A-222C is coupled to a drive configured to move the belt or mesh and transfer the nodes 110. The storage device 220 also includes a node servicing system 223, which may include a data in/data out system and a node recharging system. In one example, the node servicing system 223 comprises a plurality of wires or cables (not shown) which detachably couple to one or more of the plurality of nodes 110.

Figure 8:
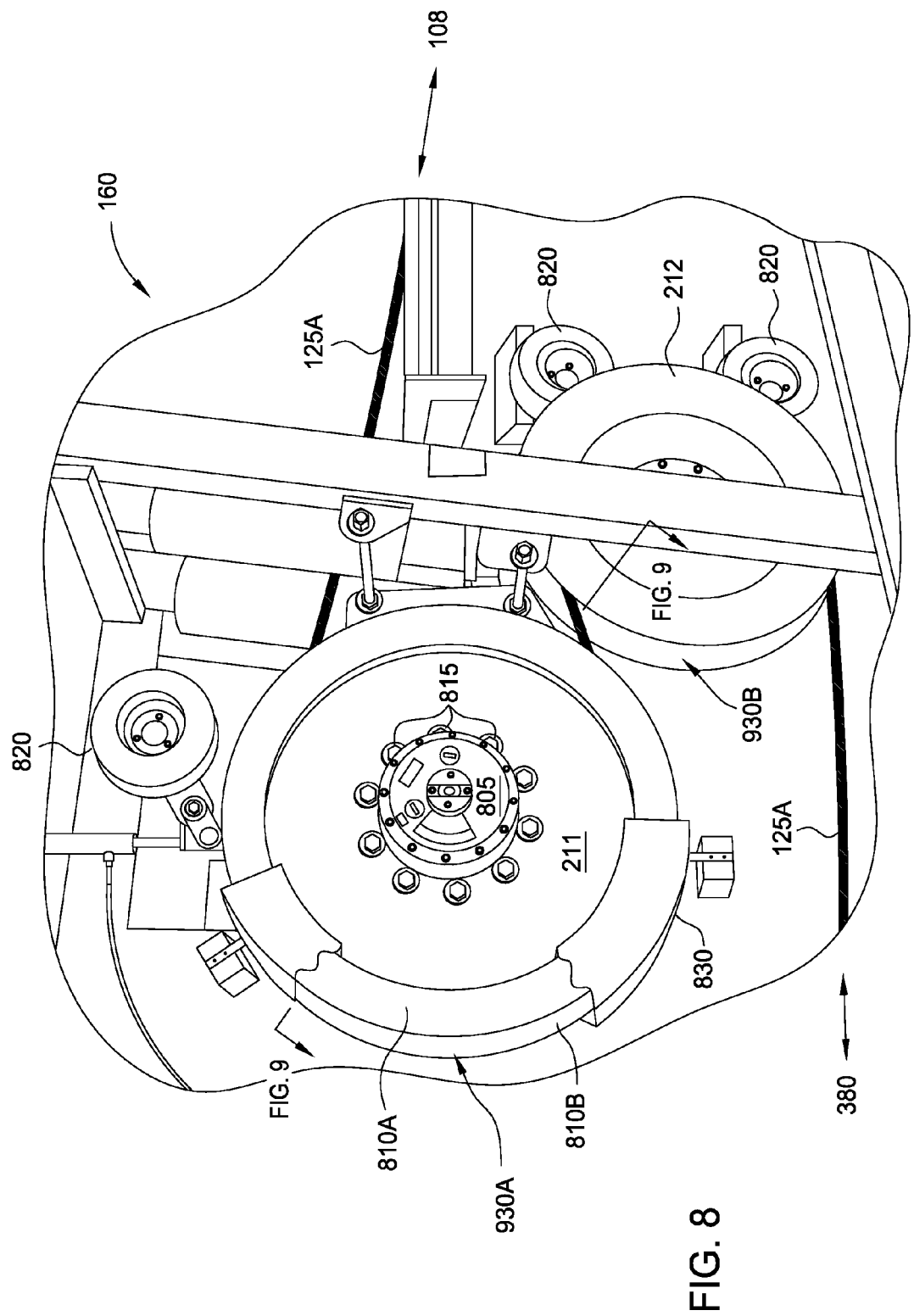
FIG. 8 is a perspective view of one embodiment of a cable handler.

The cable handling system 210 includes a portion of a workstation 145 where nodes 110 may be attached or detached from the cable 125A, 125B. The cable handling system 210 also includes a cable handler 160 and a cable storage device 213. The cable handler 160 may be a winch, a powered roller, spool, or sheave adapted to retrieve or deploy the cable 125A and/or 125B. The cable storage device 213 may include a cable storage area or bin located in or on the backdeck 115 and may also include a cable handling mechanism, such as a spool, a cable puller, a cable squirter, or other device adapted to lay or pick-up cable 125A from the cable storage area. The cable 125A is routed by the cable handler 160 to or from the cable storage device 213 and a ramp 214 coupled to the trailing end 150, or stern, of the vessel 105. The cable 125A (or 125B) is routed across the workstation 145, which includes a portion of the ramp 214 and a portion of the staging portion 230. In one embodiment, the cable handler 160 includes a powered pinch sheave 211 and an idler 212 such that the cable 125A is routed in an "S" fashion through the cable handler 160 as shown in FIG. 8.

The storage device 220 and the cable handling system 210 are coupled with the staging portion 230 such that nodes 110 may be provided from the cable handling system 210 to the storage device 220, or vice versa. The staging portion 230 includes at least a portion of the workstation 145 so personnel may attach or detach nodes 110 from the cable 125A (or 125B). The staging portion 230 also includes a stationary conveyor 231 coupled between at least a portion of the ramp 214 at one end, and coupled to or adjacent a movable conveyor 232. Each of the conveyors 231 and 232 include a movable upper surface 236 adapted to support one or more nodes 110. Each of the conveyors 231 and 232 may include a rotatable belt or mesh conveyor having an upper surface 236 adapted to support one or more nodes 110. The rotatable belt or mesh on each of the conveyors 231 and 232 are coupled to a drive configured to move the belt or mesh and transfer the nodes 110.

The movable conveyor 232 has a first end 233 that substantially matches a height of the upper surface 236 of the stationary conveyor 231 and a second end 234 that may be raised or lowered relative to a second end 225 of the conveyor system 221. The interface between the stationary conveyor 231 and the movable conveyor 232 may include matching respective heights such that nodes 110 may be transported between the conveyors 231, 232 in a seamless fashion. The second end 234 may be raised or lowered to substantially match the height of one of the conveyor sections 222A-222C in a manner that provides a travel path from each of the conveyor sections 222A-222C to the stationary conveyor 231, and vice versa.

Figure 6:
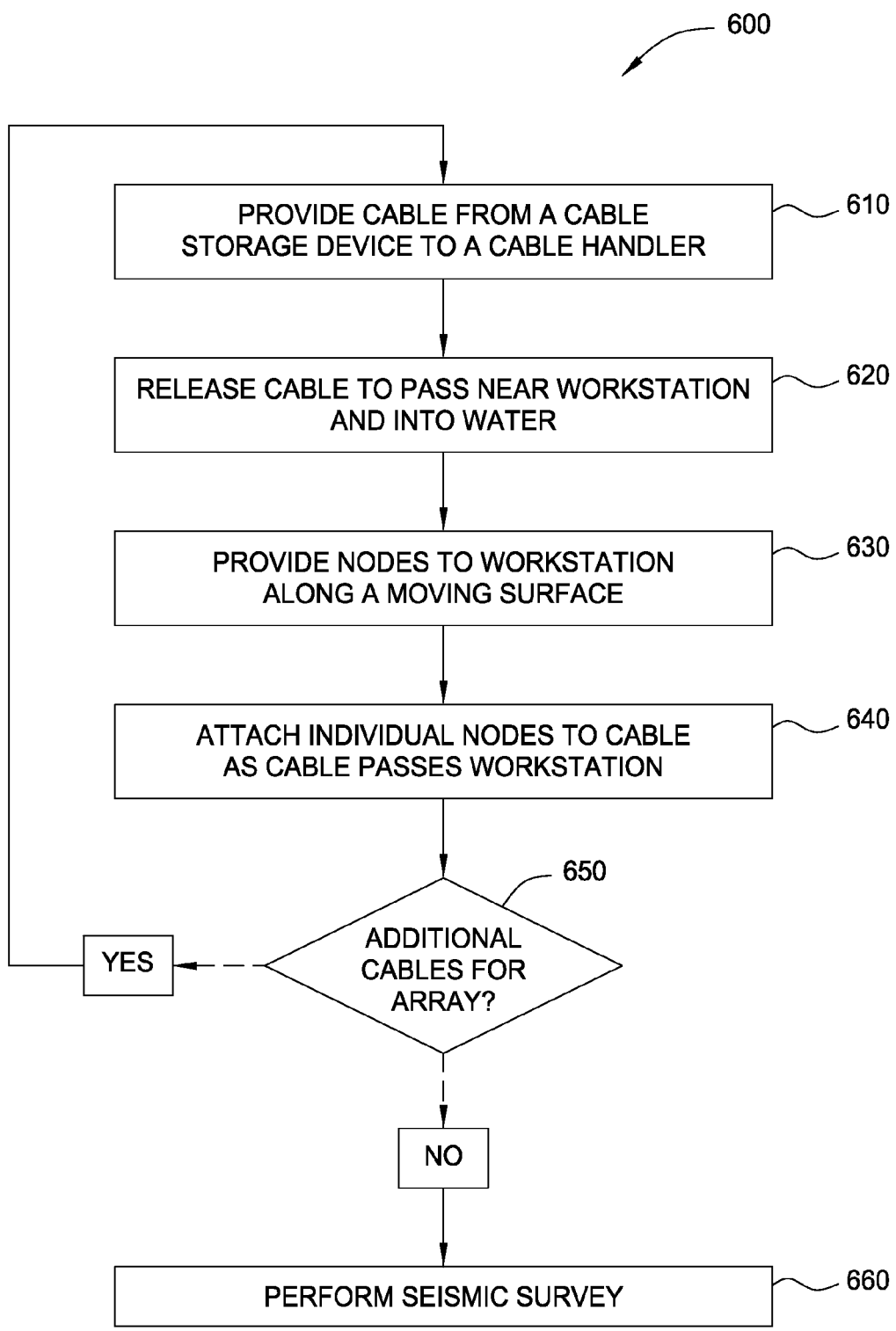
FIG. 6 is a flowchart showing one embodiment of a deployment method.
Figure 10:
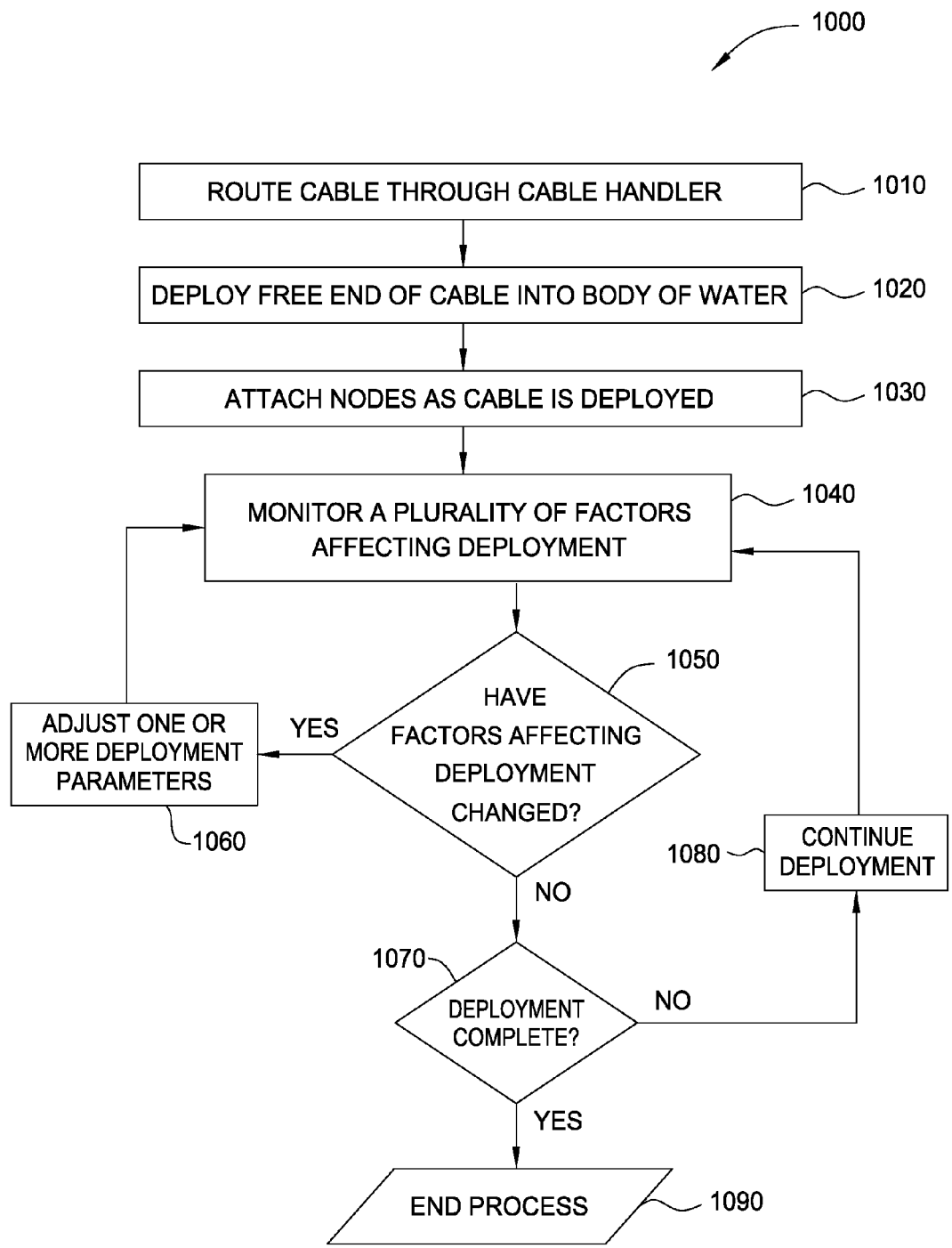
FIG. 10 is a flowchart showing one embodiment of a deployment method.

In a deployment operation, which is further detailed in FIGS. 6 and 10, the cable 125A may be coupled to the cable handler 160 and routed to pass near the workstation 145. Nodes 110 may be routed from one of the conveyor sections 222A-222C across the movable conveyor 232 and the stationary conveyor 231 to the workstation 145. At the workstation, personnel may attach the nodes to the cable 125A at node attachment points 245 disposed on the cable 125A. In one embodiment, personnel at or near the workstation 145 may attach a rope, tether, chain or cable, such as a lanyard 240, to the cable 125A. The lanyard 240 may be flexible and adapted to couple at one end to a node 110 and at another end to the cable 125A at the node attachment point 245. In one embodiment, the lanyard 240 is a non-conductive rope, chain or cable. The lanyard 240 may be tied to each of the node attachment point 245 and node 110, fastened with clamp devices, such as D-rings, shackles, clips or carabineer clamps, or other fastener.

As the cable 125A is deployed from the vessel 105, the nodes 110 and cable 125A fall through the water column 120 to rest at or near the floor 130, as shown as the mainline cable 125B in FIG. 1A. This operation continues until the cable 125A is paid out to a second end where an anchor device and/or flotation device is coupled to a free end 135 described in FIG. 1A. Additional lengths of cable 125A may be coupled to the cable handler 160, and paid out similarly as described above, until an array of mainline cables 125B is laid out on the floor 130. Once one or more mainline cables 125B are positioned on the floor 130, a seismic survey may be performed.

Figure 7:
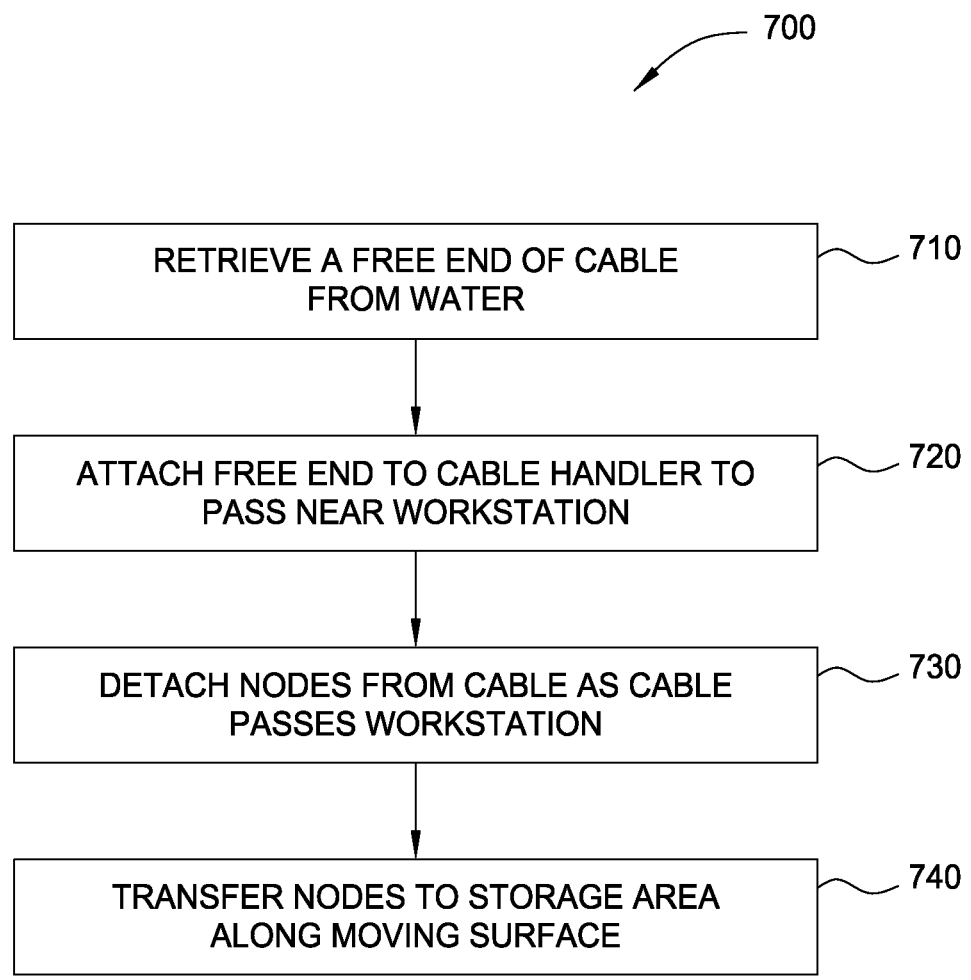
FIG. 7 is a flow chart showing one embodiment of a retrieval method.

A retrieval operation may be performed in a generally reverse manner after the seismic survey is performed, which is further illustrated at FIG. 7. One of the free ends of the cable 125B is interfaced with the cable handler 160. As the cable 125B is hauled out of the water, and onto the vessel 105, the cable 125B passes over the workstation 145 where personnel detach the nodes 110 and/or lanyards 240 from the cable 125B. Nodes 110 may be routed to one of the conveyor sections 222A-222C by the stationary conveyor 231 and movable conveyor 232 for storage, data retrieval, charging and/or maintenance.

Figure 3:
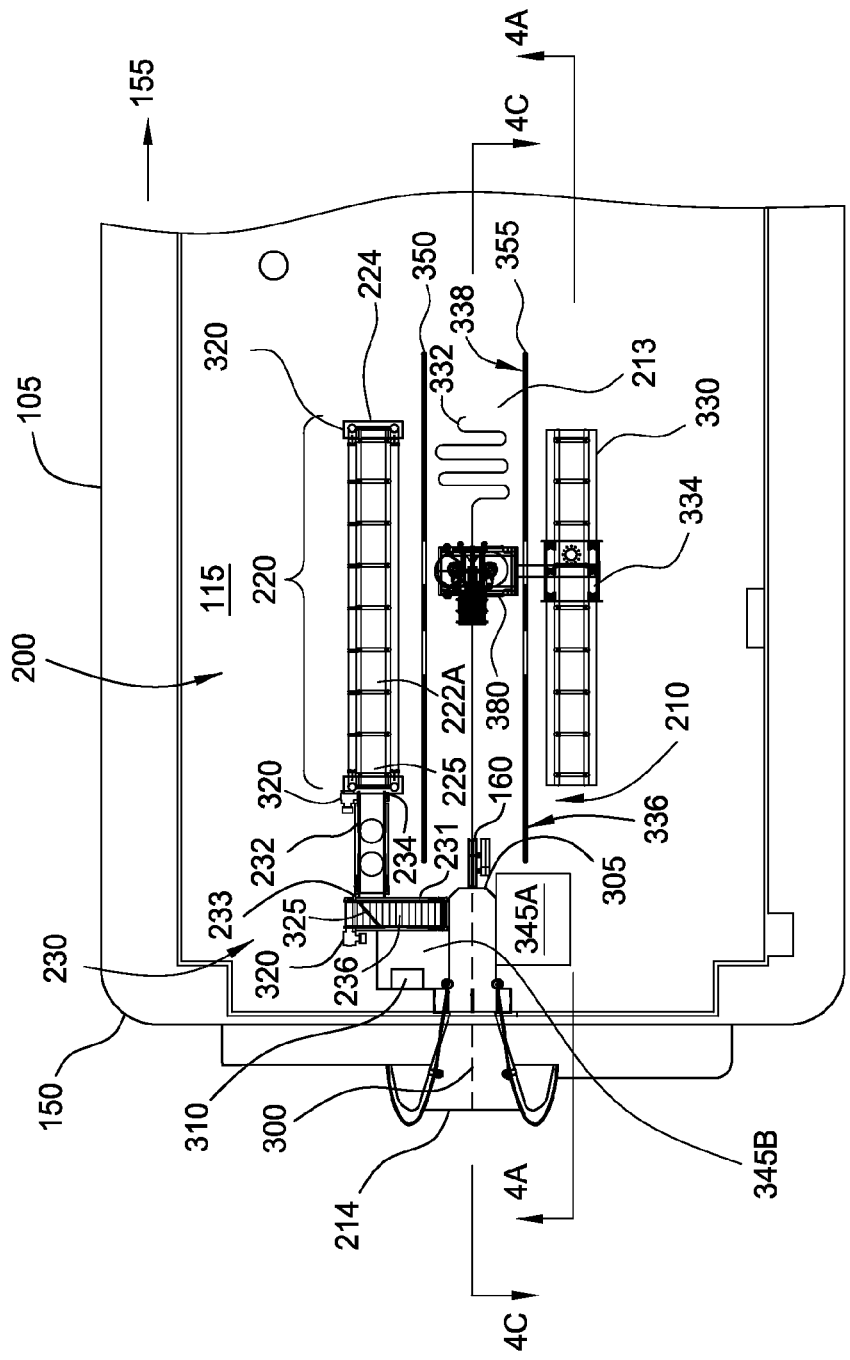
FIG. 3 is a schematic top view of a portion of a vessel having one embodiment of a node storage and handling system.

FIG. 3 is a schematic plan view of a portion of a vessel 105 having one embodiment of a node storage and handling system 200. The node storage and handling system 200 includes a cable handling system 210 and a storage device 220 coupled by a staging portion 230. Each of the conveyors 231, 232, and each conveyor section disposed in the conveyor system 221 (only conveyor section 222A is shown) includes a drive system 320 that may be a reversible, variable speed motor that provides bidirectional and controlled movement of the conveyor sections 222A-222C, conveyor 231, and conveyor 232 and the nodes 110 thereon. As the stationary conveyor 231 and movable conveyor 232 are coupled together at a substantially normal orientation, a diverter 325 may be coupled above an upper surface 236 of the stationary conveyor 231. The diverter 325 is configured to turn or reorient nodes 110 at the interface between the movable conveyor 232 and stationary conveyor 231 and may be coupled in a manner that does not interfere with the movement of the upper surface 236 of the stationary conveyor 231 or the movable conveyor 232. In one embodiment, the diverter 325 is a straight or curved plate disposed above a movable upper surface 236 of the stationary conveyor 231. In one specific embodiment, the diverter 325 is disposed above the movable upper surface 236 at about a 45° angle to the travel direction of the movable upper surface 236.

The backdeck 115 of the vessel 105 may also include one or more workstations 345A and 345B where personnel may handle nodes along a cable path 300 (shown as a dashed line) between a portion of the ramp 214 and cable handler 160. Each of the workstations 345A, 345B are adjacent a tray 305 that lies under or on the cable path 300. Each workstation 345A, 345B includes a portion of the backdeck 115 sufficient for at least one person to easily and safely access the cable and/or nodes 110. At least one of the workstations 345A, 345B may include a controller 310 adapted to control one or more functions of the node storage and handling system 200. For example, the controller 310 may allow personnel to control retrieval or deployment speed of the cable handler 160, rotational speeds of one or both of the conveyors 231, 232, a height of the second end 234 of the movable conveyor 232, speeds of individual conveyor sections on the conveyor system 221, and combinations thereof.

The cable handling system 210 includes a cable storage device 213 that includes a cable puller 380 adjacent a cable bin 332. In one embodiment, the cable puller 380 is movably coupled to a frame 330 in a cantilever fashion. The cable bin 332 includes at least two rails 350 and 355 adapted to separate an area from the backdeck 115 for cable storage. The cable puller 380 may be coupled to a trolley 334 disposed on the frame 330. The trolley 334 and cable puller 380 are adapted to move relative to the cable bin 332 to deposit or feed the cable 125A to or from the cable bin 332 in an orderly fashion. For example, during a deployment operation, the cable puller 380 and trolley 334 may initially be near a first end 336 of the cable bin 332 and move toward a second end 338 to pick up the cable 125A in the bin 332 in a stepwise and orderly fashion. In a retrieval operation, the cable puller 380 and trolley 334 may initially start at the second end 338 and move toward the first end 336 to lay the cable 125A in the bin 332 in a stepwise and orderly fashion.

FIG. 4A is a schematic top view of a portion of the node storage and handling system 200 shown in FIG. 3. In one embodiment, at least a portion of the staging portion 230 includes a movable conveyor 232 having a first end 233 and a second end 234. The first end 233 includes a height that substantially equals the height of the stationary conveyor 231 while the second end 234 may move up or down relative to the individual conveyor sections 222A-222C. As an example, the second end 234 of the movable conveyor 232 may be raised to transfer nodes 110 to or from conveyor section 222A, as shown in phantom. An actuator 400, which may be a hydraulic cylinder, a pneumatic cylinder, a lead screw or other linear actuator, may be coupled to the movable conveyor 232 to control vertical positioning of the second end 234. In one embodiment, the first end 233 includes a pivot point 402. The pivot point 402 maintains the height of the upper surface 236 of the movable conveyor 232 with the height of the upper surface 236 of the stationary conveyor 231 while allowing the second end 234 to move up and down.

Each of the conveyor sections 222A-222C may provide storage for and transport of a plurality of nodes 110. In one embodiment, each conveyor section 222A-222C may be configured to store and transport up to about 16 nodes 110 per section, in another embodiment, about 32 nodes may be stored and transported by each section 222A-222C. In another example, each conveyor section 222A-222C may be configured to store and transport up to about 200 nodes per section. The conveyor system 221 may also be of a suitable length or height that is commiserate with the available deck space of the vessel 105, and may be coupled with additional conveyor systems similar to conveyor system 221. For example, the conveyor system 221 includes a first end 224 opposite the second end 225, and a second conveyor system (not shown) may be placed adjacent the first end 224. In this example, conveyor sections 222A-222C may be positioned adjacent other conveyor sections (not shown) such that a greater storage capacity for nodes 110 may be provided.

FIG. 4B is a schematic front view of a conveyor system 221 having one embodiment of a node servicing system 223, which may include a data in/data out system, such as a digital data collection system (DDCS), and a node recharging system. The node servicing system 223 includes a plurality of leads 405 adapted to couple to nodes 110. Each lead 405 may be a wire or cable adapted to transmit data to, or receive data from, a controller, and/or be coupled to a power source to recharge the respective node 110 it is coupled to.

FIG. 4C is a schematic side view of the cable handling system 210 shown in FIG. 3. As explained above with reference to FIG. 3, the cable storage device 213 may include a frame 330 that is adjacent a cable bin 332 and a cable puller 380 is movably coupled to the frame 330 in a cantilever fashion. In another embodiment, the cable puller 380 may be directly coupled to rails 350 and 355 (only one is shown in this view) such that the frame 330 and trolley 334 are not needed. For example, the cable puller 380 may include a drive system 410 adapted to move the cable puller 380 relative to the ends 336 and 338 of the rails 350, 355. In this manner, space on the backdeck 115 required for the cable handling system 210 may be reduced.

Figure 5:
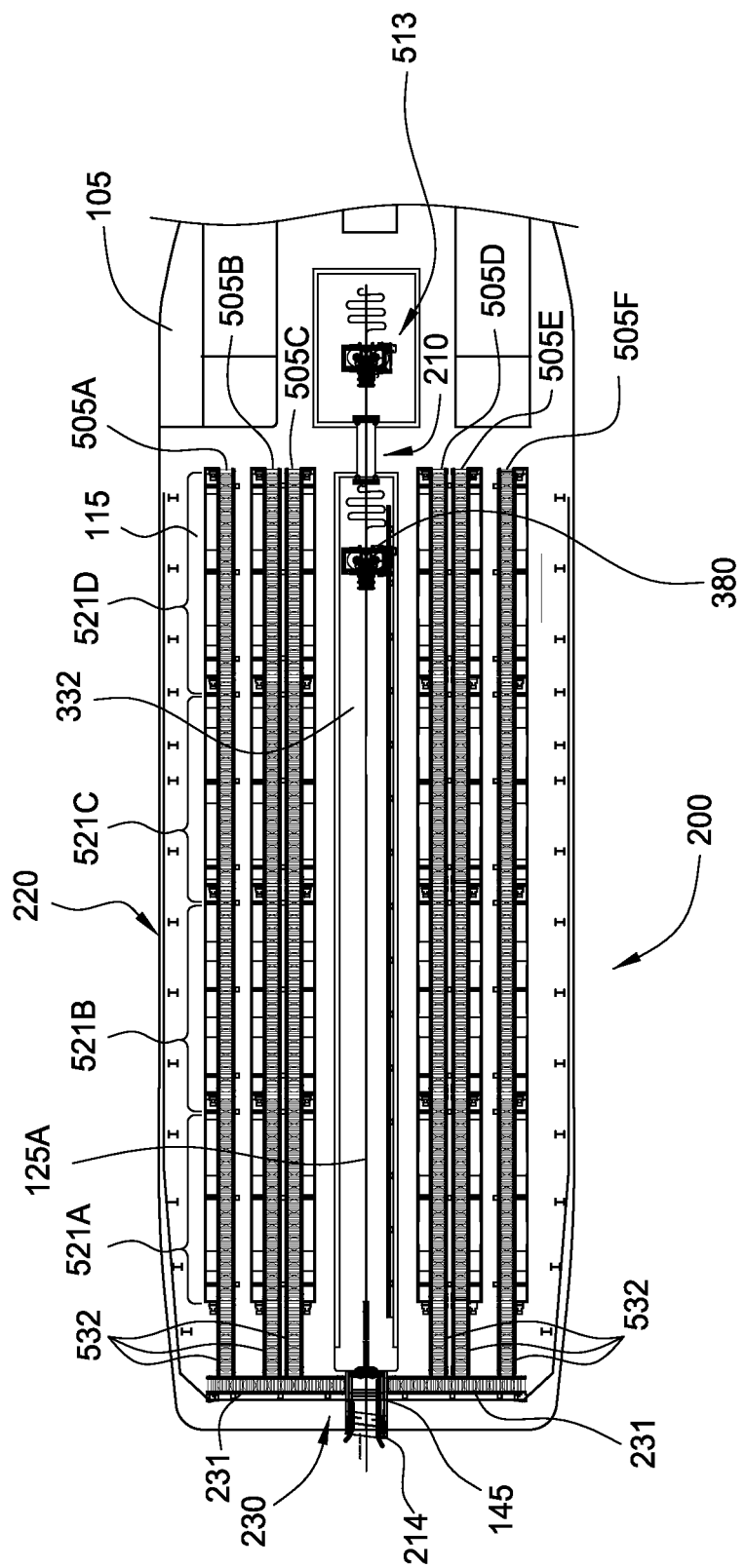
FIG. 5 is a top plan view of a portion of a vessel having another embodiment of a node storage and handling system.

FIG. 5 is a top plan view of a portion of a vessel 105 having another embodiment of a node storage and handling system 200. In this embodiment, conveyor systems 521A-521D are coupled in an end to end manner to extend the node storage area of the storage device 220. Each conveyor system 521A-521D may be similar to conveyor system 221 as described above. For example, each conveyor system 521A-521D may include three vertically stacked conveyors sections similar to conveyor sections 222A-222C, or a suitable number of stacked conveyors sections, such as two or more stacked conveyors sections. In this embodiment, the conveyor systems 521A-521D are arranged in rows 505A-505F that are substantially parallel to the cable path. Two stationary conveyors 231 are provided along two sides of the ramp 214 to facilitate transfer of nodes 110 to a plurality of movable conveyors 532. The movable conveyors 532 may be similar to the movable conveyors 232 described above, and are aligned with each row 505A-505F. Each row 505A-505F may facilitate storage and transfer of a plurality of nodes 110 and rows may be added or subtracted based on the width of the backdeck 115. In one embodiment, each row 505A-505F facilitates storage and transfer of about 200 nodes 110, per row. In this embodiment, the vessel 105 may store about 1200 nodes 110. A secondary cable storage area 513 may also be added to the vessel 105 to facilitate storage of additional cables 125A.

FIG. 6 is a flowchart showing one embodiment of a deployment method 600. At 610, a cable 125A having a plurality of node attachment points 245 is coupled to a cable handler 160, which may comprise routing a free end of the cable 125A in an "S" fashion through the cable handler 160 as shown in FIG. 8. The free end 135 of the cable 125A may be coupled to an anchor device 140 and/or flotation device 165 (FIGS. 1A and 1B) and disposed into the water over the trailing end 150 of the vessel 105. At 620, the cable 125A is paid out or controllably released by the cable handler 160 to pass over a portion of or adjacent to the workstation 145 and into the body of water 108. At 630, nodes 110 are provided to the workstation 145 from the node storage device 220 along a moving surface. In one embodiment, the moving surface includes multiple conveyor belts disposed on each of the conveyor sections 222A-222C, the stationary conveyor 231 and movable conveyor 232. In a specific embodiment, nodes 110 travel from one of the conveyor sections 222A-222C to the stationary conveyor 231 across the movable conveyor 232 to the workstation 145. At 640, individual nodes 110 are attached to the cable 125A as the cable 125A passes the workstation 145. In one embodiment, personnel at or near the workstation 145 may attach a lanyard 240 to the cable 125A. The lanyard 240 may be tied or otherwise fastened to each of the node attachment point 245 and node 110. The operation described at 640 may continue until the cable 125B is released by the cable handler 160 to a second end where another anchor device 140 and/or flotation device 165 may be coupled thereto. The cable 125B may be released from the vessel 105 and allowed to rest at or near the floor 130 of the water column 120. Alternatively, a free end 135 of another length of cable 125A may be attached to the second end of the cable 125B in order to lengthen the mainline cable 125B. In this embodiment, the method may repeat 610-640 to attach and deploy additional nodes 110 on a second length of cable 125A.

At 650, a determination may be made based on the area of the array to be laid at or near the floor 130 of the water column 120. If additional mainline cables 125B are needed for the array, additional lengths of cable 125A may be provided and steps 610-640 are repeated to provide additional mainline cables 125B. If additional cables 125B are not needed for the array, and one or more mainline cables 125B are positioned on the floor 130 to define the array, a seismic survey may be performed at 660. At 660, a seismic energy source may be actuated to provide one or more acoustic signals which is propagated into the earth's surface. The reflected signals are detected and recorded by the nodes 110 in the array.

FIG. 7 is a flow chart illustrating one embodiment of a retrieval method 700. After a seismic survey has been performed, and/or a determination has been made to retrieve the cable 125B from the floor 130, a free end 135 of the cable may be retrieved from the water at 710. In one example, a buoyancy device 165 (FIGS. 1A and 1B) may be activated to raise the free end 135 of the cable 125B. One or both of the buoyancy device 165 and cable 125B may be grabbed or secured by personnel on the vessel 105. 720 describes attaching the free end 135 to the cable handler 160 in a manner that allows the cable 125B to pass at or near the workstation 145 once the cable 125B is secured by personnel. At 730 nodes are detached from the cable 125B as the cable passes the workstation 145. In one embodiment, personnel at the workstation 145 detach the lanyards 240 from the node attachment points 245 on the cable 1258. At 740 detached nodes 110 are transferred to the node storage device 220 along a moving surface 236. In one embodiment, the moving surface 236 includes multiple conveyor belts disposed on each of the stationary conveyor 231, the movable conveyor 232 and each conveyor section 222A-222C. In a specific embodiment, nodes 110 travel from the workstation 145 to the stationary conveyor 231 and across the movable conveyor 232 to one of the conveyor sections 222A-222C.

After nodes 110 have been transferred to the conveyor sections 222A-222C, the node servicing system 223 may be interfaced with at least a portion of the retrieved nodes 110. Data may be retrieved and/or the nodes may be recharged and otherwise readied for long-term storage or a subsequent deployment operation.

FIG. 8 is a perspective view of one embodiment of a cable handler 160. In this embodiment, the cable handler 160 includes a powered pinch sheave 211 and an idler pulley 212. The powered pinch sheave 211 includes a hub 805 coupled to two side members 810A, 810B by a plurality of bolts 815. The side members 810A, 810B define a sheave well 930A, around an outer circumference, that is adapted to receive a cable 125A. The idler pulley 212 may also include side members to define a sheave well 930B. The hub 805 may be a drive gear, such as a planetary reduction gear, coupled to a drive motor 910, shown in FIG. 9, adapted to provide a torque to the sheave 211. A plurality of rotatable guide members 820 may be disposed along the circumference of one or both of the sheave 211 and idler pulley 212. The guide members 820 are configured to provide a compressive force against each of the sheave 211 and the idler pulley 212. Each guide member 820 may be a compliant circular body that is adapted to contact at least a portion of the circumference of the sheave 211 and/or the idler pulley 212. Each guide member 820 is adapted to rotate relative to the sheave 211 and/or the idler pulley 212. Each guide member 820 may be actuated away from the sheave 211 and the idler pulley 212 to allow personnel to route the cable 125A through the cable handler 160. Additionally, a guard 830, only partially shown, may be used in combination or in place of the guide members 820 to reduce the possibility of the cable 125A from falling out of the sheave well 930A. The idler pulley 212 may also include a guard (not shown).

Figure 9:
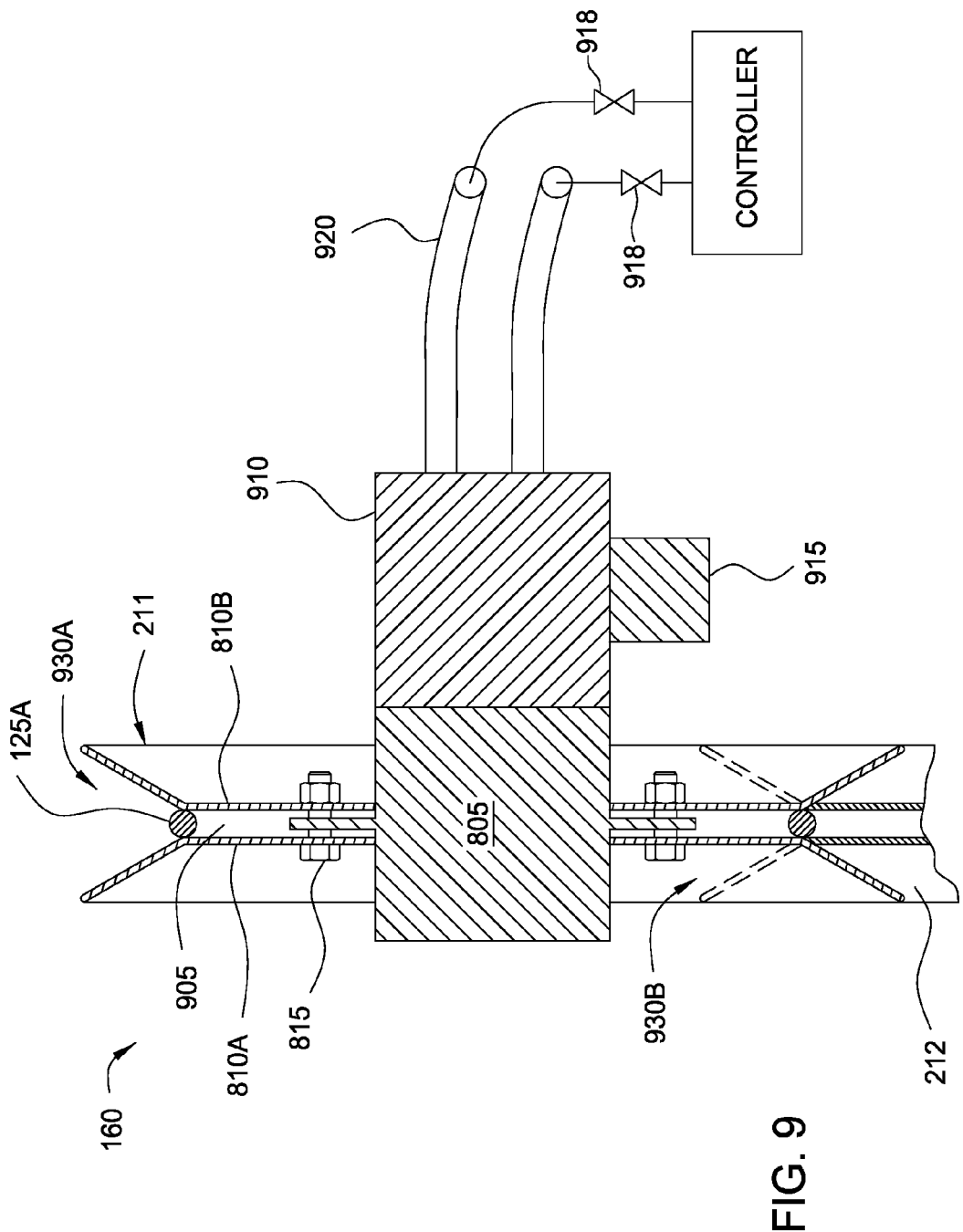
FIG. 9 is a cross-sectional view of the cable handler of FIG. 8.

FIG. 9 is a cross-sectional view of the cable handler 160 of FIG. 8. The powered pinch sheave 211 includes two side members 810A and 810B coupled to the hub 805. Each of the side members 810A, 810B are spaced to define a radial gap 905 that receives at least a portion of the cable 125A. The radial gap 905 is configured to provide additional friction to the cable 125A as it passes around the sheave 211. The hub 805 is coupled to a drive motor 910 adapted to rotate the sheave 211. The drive motor 910 may be hydraulically powered, electrically powered, pneumatically powered, or mechanically powered, such as a by a shaft coupled to an engine. The drive motor 910 is adapted to provide variable and reversible rotation to the sheave 211. The drive motor 910 may be coupled to a mounting portion 915 to stabilize the drive motor 910. In this embodiment, the drive motor 910 is a hydraulic motor coupled to respective valves 918 by hoses 920. In one embodiment, the valves 918 may be coupled to a controller to control the speed and/or rotation of the sheave 211.

In one embodiment, each of the powered pinch sheave 211 and the idler pulley 212 include respective circumferential sheave wells, shown as 930A and 930B (930B is shown in phantom). Each sheave well 930A, 930B is sized to receive the cable 125A and a portion of a guide member 820 (FIG. 8).

In one embodiment, the diameter of the sheave well 930A that the cable 125A is adapted to contact is about 32 inches. The powered pinch sheave 211 and the idler pulley 212 are positioned such that the cable 125A is routed in an "S" fashion as shown in FIG. 8.

FIG. 10 depicts a method 1000 for deploying a cable, which will be described in reference to FIGS. 1A and 1B, unless otherwise noted. For ease of understanding, a cable 125 will be described with FIGS. 10 and 11. The cable 125 as described in FIGS. 10 and 11 may refer to a rope or cable with or without nodes attached. In one embodiment, the method 1000 compensates for factors that may affect placement of the nodes 110 on the floor 130 of the water column 120. The process starts at 1010, where the cable 125 is routed through the cable handler 160. In one embodiment, the cable 125 may be routed as depicted in FIG. 8. At 1020, a free end 135 of the cable 125 is deployed into the water column 120. In one embodiment, the free end 135 of the cable 125 may include an attached node 110, a weight, such as an anchor device 140, and/or flotation device 165. At 1030, nodes 110 are attached to the cable 125 as the cable 125 is being deployed into the water column 120.

After deployment of the free end 135, a plurality of deployment parameters are assessed and monitored. The deployment parameters may include a rotational speed of the pinch sheave 211 (FIGS. 8 and 9), a tensional metric of the cable 125, a speed of the vessel 105, and a position of the vessel 105 in the body of water 108. In one embodiment, the deployment parameters include factors that may be measured and controlled by personnel on the vessel 105. The deployment parameters may also include a placement plan of the nodes 110 on the floor 130 of the water column 120. For example, the deployment parameters may include a speed of the vessel in the water, a deployment speed of the cable, intervals between nodes 110 along the cable 125, among other factors that facilitate intended placement of the nodes 110 on the floor 130.

At 1040, a plurality of factors affecting deployment are monitored during deployment of the cable 125. Factors affecting deployment may include a flow current within the water column 120, a wind speed and/or direction, a metric indicative of drag of the cable 125 in the water column 120 and/or along the floor 130, among other factors that may affect deployment and/or placement of the nodes 110. Flow currents within the water column 120 may be naturally occurring currents and/or currents generated by the vessel 105, currents generated by a propulsion system of the vessel 105, and combinations thereof. One or more of the factors affecting deployment may be monitored by a controller (not shown) and/or observation devices (also not shown), such as a wind monitor, a current monitor, a global positioning system (GPS), a speed monitor, force monitors and the like, attached to the cable handler 160 and/or vessel 105. Monitoring of one or more of the factors affecting deployment to maintain and/or adjust one or more deployment parameters as described herein facilitates a specific fall profile of the cable 125, which is described below.

At 1050, a check is done to determine if any of the factors affecting deployment has changed. In one embodiment, the check may be done by comparing observations taken in previous time periods to observations at a later time period. If any of the factors affecting deployment has changed then the method moves to 1060. At 1060, one or more deployment parameters may be adjusted based on current or past observations. Once one or more parameters are adjusted, the process again proceeds to 1040 where factors affecting deployment are monitored, and then to 1050 where the factors affecting deployment are re-checked to see if any factors affecting deployment have changed. If any factors affecting deployment have not changed then the process proceeds to 1070. At 1070, a check is done to see if a desired length of the cable 125 has been deployed. If not, the process moves to 1080 where deployment of the cable is continued. After 1080, the process again moves back to 1040, which is described above. If deployment is complete then the process moves to 1090 and the process may end. If an array comprising more than one cables disposed on the floor 130 is desired, discrete additional cables may be coupled to the cable handler as described at 1010 and the process may continue until all cables have been deployed.

Figure 11:
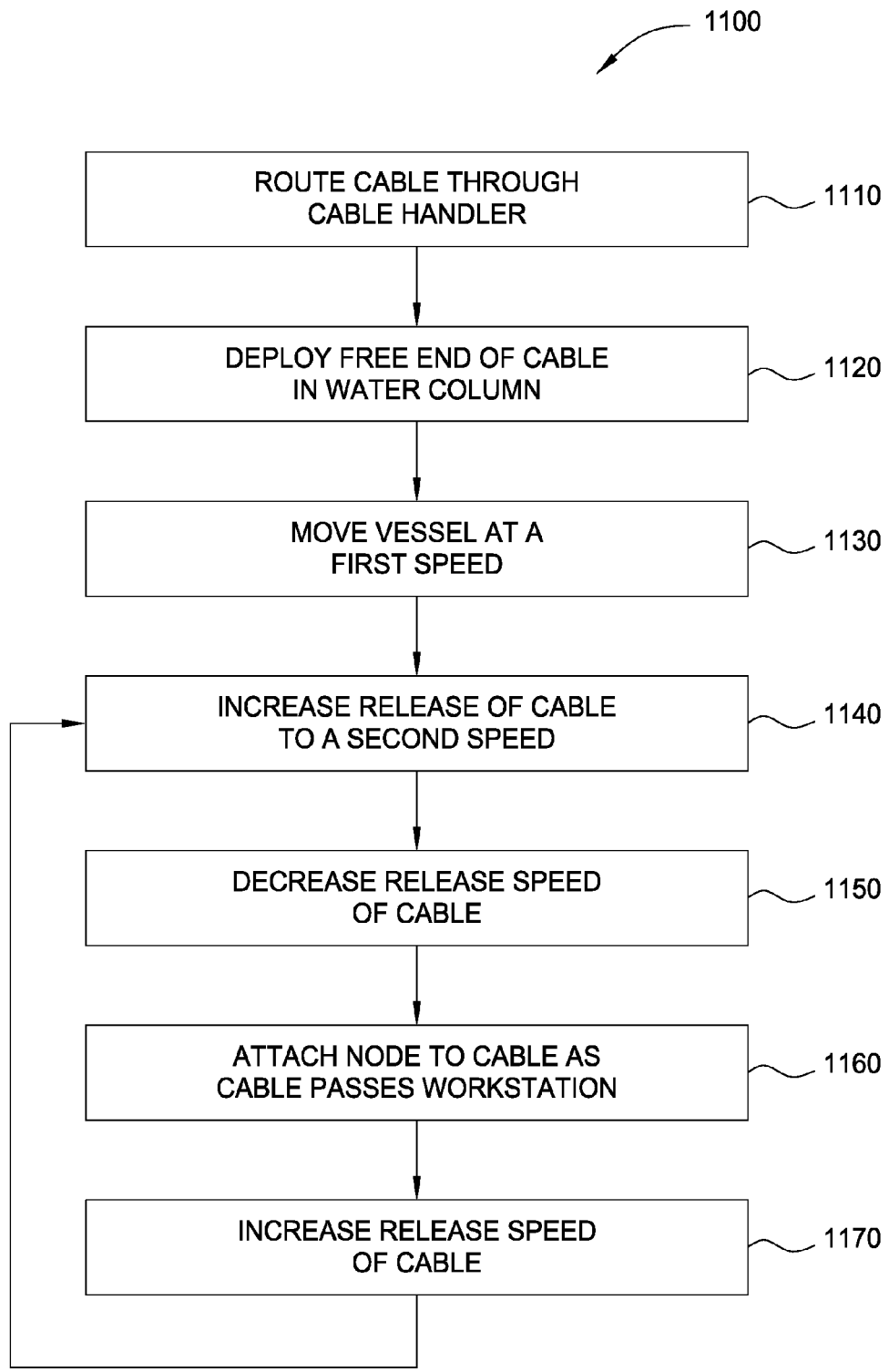
FIG. 11 is a flowchart showing another embodiment of a deployment method.

FIG. 11 is a flowchart describing another embodiment of a deployment method 1100, which will be described in reference to FIGS. 1A and 1B, unless otherwise noted. The method begins at 1110, where the cable 125 is routed through a cable handler 160. While the method 1100 is described using the cable handler 160, any device capable of un-spooling a cable or rope in a controlled manner may be used. In one embodiment, the cable 125 may be routed through the cable handler 160 as depicted in FIG. 8. At 1120, a free end 135 of the cable 125 is deployed into the water column 120. In one embodiment, the free end 135 of the cable 125 may include an anchor device 140 and/or flotation device 165.

After the free end 135 of the cable 125 has been deployed, the vessel 105 may be put into motion. In one embodiment, motion of the vessel 105 is initiated after the anchor device 140 has reached the floor 130. Once the free end 135 has been placed on the floor 130 and/or the cable 125 is otherwise suitably locationally placed in the water column 120 and/or on the floor 130, motion of the vessel 105 is increased. In one embodiment, the motion of vessel 105 may be increased to a first speed as described at 1130. In one embodiment, the first speed is between about 3 knots to about 5 knots.

During the increase in motion of the vessel 105, the cable 125 may be increased and continuously released out of the vessel 105 into the water column 120 while the vessel 105 speed is maintained. In one embodiment, the release rate or speed of the cable 125 may be varied while the vessel 105 speed is maintained. For example, the first speed of the vessel 105 may be maintained and the release of the cable may be increased to a second speed. In one embodiment, the second speed is greater than the first speed. In one example, the release of the cable 125 is provided and controlled by the cable handler 160. In one example, the release rate of the cable 125 is controlled by the cable handler 160 and the release rate is determined by the rotational speed of the cable handler 160, specifically the rotational speed of the powered pinch sheave 211 (FIG. 8). In one embodiment, the rotational speed is varied between about 0 revolutions per minute (RPM) and about 100 RPM based on a diameter of the powered pinch sheave 211 of about 32 inches. In another embodiment, the cable 125 is released at a rate that equals the first speed of the vessel 105.

In one embodiment, the release rate of the cable 125 is faster than the first speed of the vessel 105 as described at 1140. In this embodiment, the release speed of the cable 125 is greater than the vessel speed. For example, the vessel speed may remain constant and the release speed of the cable is increased to provide slack in the cable 125. In this embodiment, the cable 125 may be released at a rate that causes the cable to gather or accumulate at or near the surface of the water column 120 adjacent the stern of the vessel 105. For example, the cable 125 is released at a rate or speed faster than the vessel speed, thereby creating slack within the cable 125 at or near the surface of the water column 120. In one example, if the first speed of the vessel 105 is maintained at about 3.5 knots, the release speed of the cable may be about 90 RPM based on a diameter of the powered pinch sheave 211 of about 32 inches.

At 1150, the release rate or speed of the cable 125 is reduced while the vessel 105 speed is maintained. In one embodiment, the second speed of the cable 125 is reduced to facilitate attachment of a node 110 to the cable 125, as shown at 1160, while the first speed of the vessel 105 is maintained. The decreased release rate may be between 0 RPM to about 10 RPM based on a diameter of the powered pinch sheave 211 of about 32 inches at the cable contact area, for example, between about 0 RPM to about 2 RPM. Specifically, the release rate of the cable handler 160 is reduced as a node attachment point 245 (FIG. 2) nears the workstation 145 (FIG. 2). In this embodiment, the vessel 105 speed is maintained such that the accumulated slack in the cable 125 is depleted.

The first speed of the vessel 105 and the spacing of nodes 110 are determined so accumulated slack in the cable 125 from step 1140 is removed. For example, the first speed of the vessel 105 is determined and based at least partially on the spacing of the node attachment points 245 so accumulated slack will be removed and a desired tension will be placed on the cable 125. In one embodiment, the first speed of the vessel 105 is such that the cable 125 disposed in the water column 120 and/or nodes 110 disposed on the floor 130 is not caused to drag or be pulled.

At 1170, the release rate or speed of the cable 125 is increased after a node 110 has been attached. In one embodiment, the release rate of the cable 125 may be returned to the second speed as described above while the first speed of the vessel 105 is maintained. The increase in the release rate of the cable 125 may be based on instructions from personnel based on observing the slack in the cable 125. For example, an audible and/or visible signal or instruction may be given from personnel observing the deployment. For example, personnel may visually observe the tension in the cable 125 to provide a signal for increasing release speed of the cable 125. In another aspect, personnel may observe deployment parameters and/or factors affecting deployment to provide a signal for increasing the release speed of the cable 125. In another alternative, an audible and/or visible signal or instruction may be provided from a controller that is pre-programmed based on the speed of the vessel 105 and spacing of node attachment points 245. In another embodiment, the controller may assess deployment parameters and/or factors affecting deployment to provide a signal or instruction for increasing the release speed of the cable 125.

In one embodiment, the release rate of the cable 125 is controlled by the cable handler 160 based on instructions from a controller having appropriate software that has been programmed based on deployment parameters and/or factors affecting deployment. For example, information such as vessel speed and spacing between nodes, tensional metrics of the cable 125, among other information, may be inputted and/or monitored to provide instructions to the controller to vary the rotational speed of the cable handler 160.

As described herein, the method described above may be used to facilitate the placing of nodes 110 on the floor 130 of the water column 120. In one embodiment, the powered pinch sheave 211 maintains a deployment rate of the cable 125. The maintained deployment rate may maintain, cause, or relieve a tensional force in the cable 125. It has been found that varying the tensional force in the cable 125 can create different fall patterns of the nodes 110 and cable 125 through the water column 120.

Figure 12:
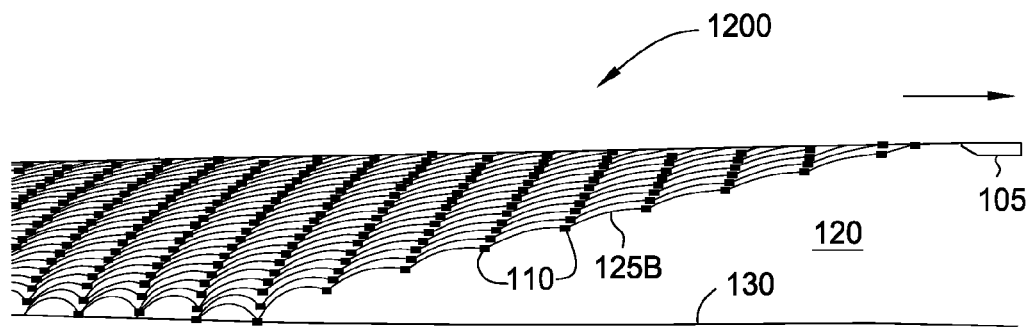
FIG. 12 shows one embodiment of a fall pattern for a mainline cable.
Figure 13:
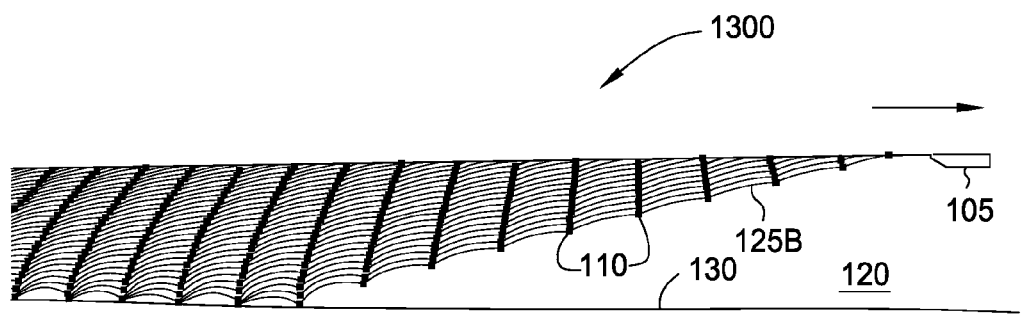
FIG. 13 shows another embodiment of a fall pattern for a mainline cable.
Figure 14:
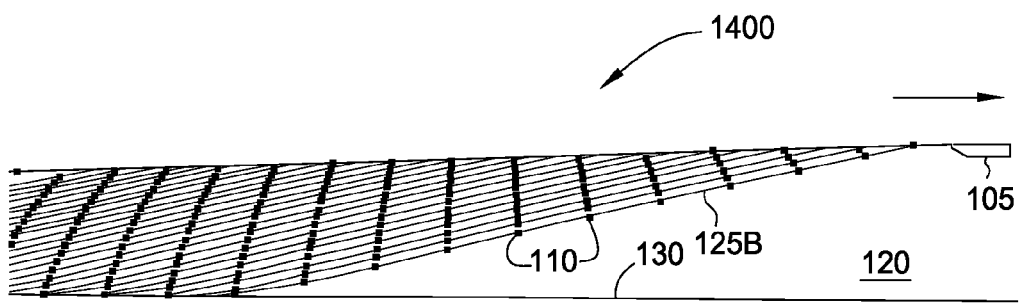
FIG. 14 shows another embodiment of a fall pattern for a mainline cable.

FIGS. 12, 13 and 14 various embodiments of a fall pattern for nodes 110 on a single mainline cable 125B. In the embodiment shown in FIG. 12, a reduced tensional force within the cable 125B is maintained. The tensional force may be monitored and regulated by compensating for factors that may affect the tensional force. The factors affecting the tension may include, but are not limited to, a rotational speed of the pinch sheave 211, a speed of the vessel 105, a flow current of the water column 120, a wind speed and direction, and a drag of the cable 125B.

In one embodiment, a speed of the vessel 105 and the rotational speed of the pinch sheave 211 may be such that the cable 1258 is deployed at a rate that is between about 1% and 30%, such as about 5% and 20%, faster than the speed of the vessel 105. At a deployment rate of about 20% faster than the speed of the vessel 105 a fall pattern 1200 as shown in FIG. 12 may be produced. In another embodiment, the speed of the vessel 105 and/or a rotational speed of the pinch sheave 211 may be increased or decreased to facilitate a deployment rate of the cable 125B to be around 5% faster than the speed of the vessel 105. At a deployment rate of about 5% faster than the speed of the vessel 105, a fall pattern 1300 as shown in FIG. 13 may be produced.

In one embodiment, the deployment rate of the cable 1258 may be regulated such that a tensional force of the deployed cable 1258, at a top surface of the body of water 108, may be maintained. The tensional force may be maintained between about 1500 Newtons (N) and 3500 N, and more specifically between about 2250 N and 2750 N. Maintaining a tensional force between these limits may produce a fall pattern 1400 as shown in FIG. 14. Further, maintaining the tensional force in the described range may help in compensating for factors affecting the placement of the nodes 110, i.e. drift of the nodes 110 away from their intended locational placement.

While the foregoing is directed to embodiments of the invention, other and further embodiments of the invention may be devised without departing from the basic scope thereof, and the scope thereof is determined by the claims that follow.

What is claimed is:

1. A marine vessel, comprising:
   a cable storage device disposed on the vessel;
   a workstation disposed on a deck of the vessel;
   a ramp at least partially disposed on the deck; and
   a node storage and handling system disposed on the vessel, the node storage and handling system comprising:
   a cable handler disposed between the cable storage device and the ramp, the cable handler having a cable disposed thereon and the cable defining a cable path passing over the workstation during a node deployment or retrieval operation;
   a node storage rack positioned between a bow and a stern of the vessel; and
   at least one conveyor belt to transfer nodes between the workstation and the node storage rack.

2. The vessel of claim 1, wherein the conveyor belt comprises a mesh material.

3. The vessel of claim 1, wherein the at least one conveyor belt is disposed adjacent to the workstation.

4. The vessel of claim 1, wherein the at least one conveyor belt is disposed on the node storage rack.

5. The vessel of claim 1, wherein the node storage rack comprises a plurality of storage racks.

6. The vessel of claim 5, wherein the plurality of storage racks share the at least one conveyor belt.

7. The vessel of claim 5, wherein each of the storage racks share a common ramp.

8. The vessel of claim 5, wherein the plurality of storage racks comprises a first storage rack adjacent a port side of the vessel and a second storage rack adjacent a starboard side of the vessel.

9. The vessel of claim 5, wherein each of the storage racks comprises a movable surface.

10. The vessel of claim 5, wherein each of the storage racks comprises a conveyor belt.

11. The vessel of claim 5, wherein the plurality of storage racks comprise a first vertically stacked plurality of storage racks and a second plurality of vertically stacked storage racks.

12. The vessel of claim 11, wherein the first vertically stacked plurality of storage racks and the second plurality of vertically stacked storage racks are positioned side by side.

13. The vessel of claim 11, wherein the first vertically stacked plurality of storage racks and the second plurality of vertically stacked storage racks are positioned end to end.

14. The vessel of claim 1, wherein the cable handler comprises a first sheave and a second sheave.

15. The vessel of claim 14, wherein the first sheave is coupled to a motor.

16. A marine vessel, comprising:
   a cable storage device disposed on the vessel;
   a workstation disposed on a deck of the vessel;
   a ramp at least partially disposed on the deck adjacent the workstation; and
   a node storage and handling system disposed on the vessel, the node storage and handling system comprising:
      a cable handler disposed between the cable storage device and the ramp, the cable handler having a cable disposed thereon and the cable defining a cable path passing over the workstation during a node deployment or retrieval operation;
      a node storage rack positioned between a bow and a stern of the vessel; and
      at least one conveyor mechanism to transfer nodes directly between the workstation and the node storage rack.

17. The vessel of claim 16, wherein the at least one conveyor mechanism comprises a moving surface.

18. The vessel of claim 17, wherein the moving surface comprises a belt.

19. The vessel of claim 16, wherein the node storage rack comprises a plurality of storage racks.

20. The vessel of claim 19, wherein the plurality of storage racks comprise a first vertically stacked plurality of storage racks and a second plurality of vertically stacked storage racks.

21. The vessel of claim 20, wherein the first vertically stacked plurality of storage racks and the second plurality of vertically stacked storage racks are positioned side by side.

22. The vessel of claim 20, wherein the first vertically stacked plurality of storage racks and the second plurality of vertically stacked storage racks are positioned end to end.

23. The vessel of claim 19, wherein each of the storage racks comprises a movable surface.

24. The vessel of claim 19, wherein the plurality of storage racks share the at least one conveyor mechanism.

25. The vessel of claim 19, wherein each of the storage racks share a common ramp.

26. The vessel of claim 19, wherein the plurality of storage racks comprises a first storage rack adjacent a port side of the vessel and a second storage rack adjacent a starboard side of the vessel.

27. The vessel of claim 26, wherein each of the first storage rack and the second storage rack comprises a movable surface.

28. The vessel of claim 26, wherein each of the first of storage rack and the second storage rack share the at least one conveyor mechanism.

29. The vessel of claim 26, wherein each of the first of storage rack and the second storage rack share a common ramp.

30. A method for performing a seismic survey in a marine environment, the method comprising:
   a deployment method for deploying a plurality of seismic sensor units into a water column, the deployment method comprising:
      providing a length of flexible cable from a cable storage device disposed on a vessel to a cable handling device;
      routing the cable to pass adjacent to a workstation disposed on the vessel;
      attaching an anchor device to a free end of the cable;
      deploying the free end of the cable into the water column along a ramp disposed on the vessel;
      adjusting a fall pattern of the cable in the water column by adjusting one or both of the forward speed of the vessel and a deployment speed of the cable handling device; and
      attaching at least one of the plurality of seismic sensor units to the cable as the cable passes the workstation.

31. The method of claim 30, wherein the flexible cable may be lengthened by affixing additional lengths of cable to the trailing end of the cable.

32. The method of claim 30, wherein the seismic sensor units are transferred to the workstation from one or more node storage racks disposed on the vessel.

33. The method of claim 32, wherein the seismic sensor units are transferred to the workstation along a moving surface.

34. The method of claim 30, wherein the cable handling device comprises a winch.

35. The method of claim 30, wherein the cable handling device comprises a powered pinch sheave.

36. The method of claim 30, wherein the seismic sensor units are affixed to the cable mechanically.

37. The method of claim 30, wherein the deployment speed is greater than the vessel speed.

38. The method of claim 30, wherein the deployment speed is zero at intermittent intervals.

39. The method of claim 38, wherein the plurality of seismic sensor units are affixed to the cable during the intermittent intervals.

40. The method of claim 39, wherein the seismic sensor units are affixed to the cable mechanically.

41. The method of claim 30, further comprising:
   a retrieval method for retrieving the plurality of seismic sensor units from the water column, the retrieval method comprising:
      reversing a direction of the cable handling device to facilitate retrieval of the flexible cable from the water column; and
      detaching the plurality of seismic sensor units from the cable as the cable passes the workstation.

42. The method of claim 41, further comprising:
   adjusting one or both of the forward speed of the vessel and a retrieval speed of the cable handling device.

43. The method of claim 42, wherein the retrieval speed is zero at intermittent intervals.

44. The method of claim 43, wherein the plurality of seismic sensor units are detached from the cable during the intermittent intervals.

* * * * *

UNITED STATES PATENT AND TRADEMARK OFFICE
CERTIFICATE OF CORRECTION

| | | |
|---|---|---|
| PATENT NO. | : 8,801,328 B2 | Page 1 of 1 |
| APPLICATION NO. | : 13/710246 | |
| DATED | : August 12, 2014 | |
| INVENTOR(S) | : Thompson et al. | |

It is certified that error appears in the above-identified patent and that said Letters Patent is hereby corrected as shown below:

Title Page, (72) Inventors:

Insert --Deceased-- after Laws.

Signed and Sealed this
Sixteenth Day of December, 2014

Michelle K. Lee
*Deputy Director of the United States Patent and Trademark Office*